Jan. 21, 1958 L. J. KABELL 2,820,845

FREQUENCY CONTROLLED OSCILLATORS

Filed Sept. 1, 1954

INVENTOR.
Louis J. Kabell
BY [signature]
ATTORNEY

United States Patent Office 2,820,845

Patented Jan. 21, 1958

2,820,845

FREQUENCY CONTROLLED OSCILLATORS

Louis J. Kabell, Palo Alto, Calif., assignor to Radio Corporation of America, a corporation of Delaware Application September 1, 1954, Serial No. 453,579

8 Claims. (Cl. 178—5.4)

Figures 1, 2:
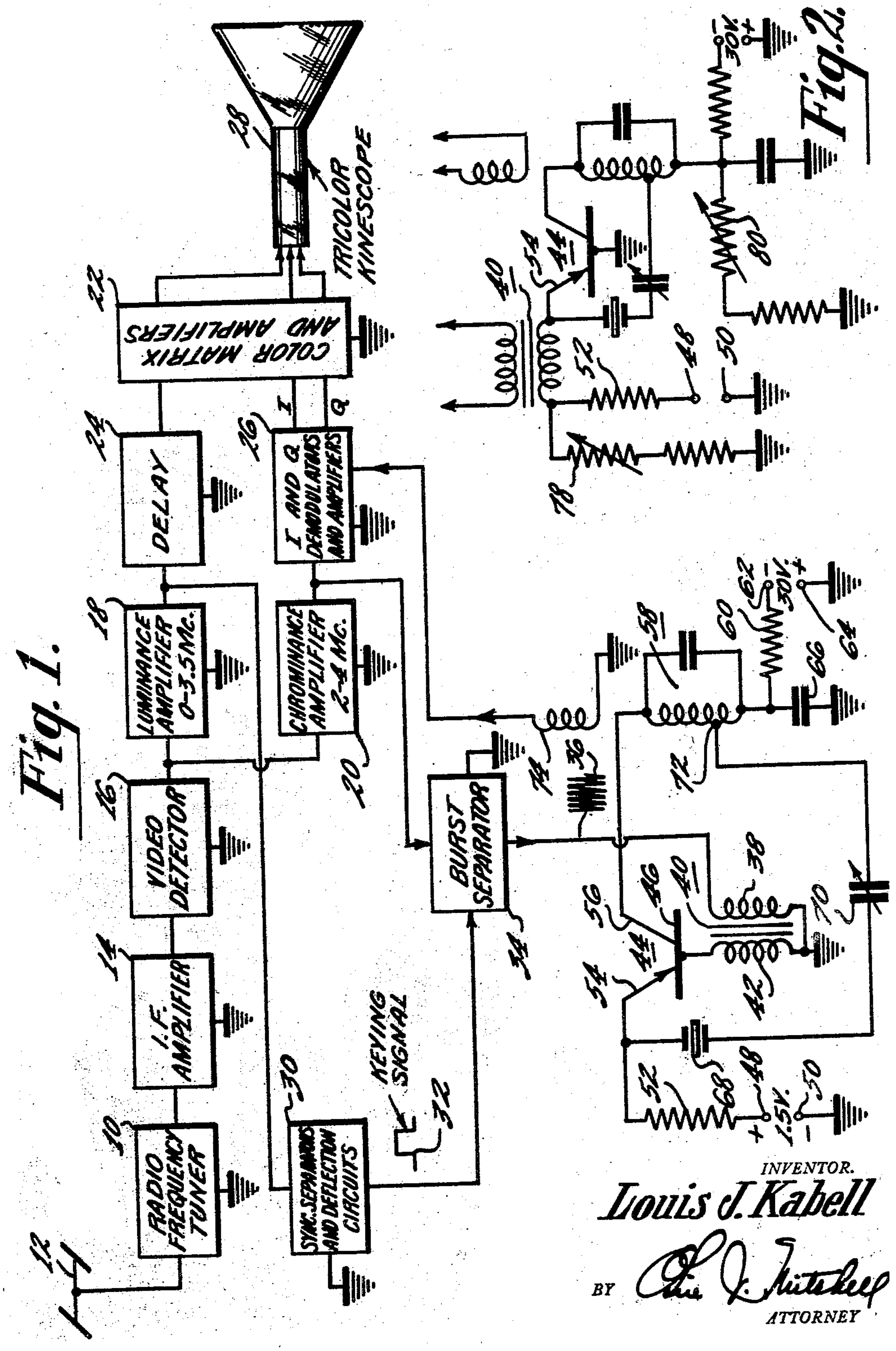

The present invention relates to improvements in frequency control circuits for oscillators and more particularly, although not necessarily exclusively, to improvements in automatic frequency control circuits useful in television receiving systems and employing semiconductor amplifier devices for maintaining a synchronous relation between television receiver operation and components of a received television signal.

More directly, the present invention relates to improvements in automatic frequency controlled oscillator circuits of the transistor variety and suitable for use in color television receivers designed for reception of an NTSC type color television signals which requires the maintaining within the receiver of an accurately synchronized radio frequency oscillator used in demodulation of chromaticity signal information.

In the electronic art, the demand frequently arises for a source of frequency stabilized alternating current signal whose excursions bear a predetermined phase or timing relation to some reference signal. In providing such a signal source, it is common practice to employ an oscillator operating in conjunction with a phase detector circuit and reactance tube circuit. The reference signal is compared with the oscillator signal in the phase comparator circuit to produce an error voltage. This error voltage is then applied to the reactance tube circuit which in turn is operatively coupled with the oscillator to change its frequency and/or operating phase in a direction to maintain the signal produced by the oscillator in phase agreement with the reference signal. In many forms of such automatic frequency, control circuits separate tubes or amplifier devices are required for each the phase detector, the oscillator, and the reactance tube.

In color television receivers suitable for the reception of NTSC color television signal, it is common practice to provide means for developing a continuous wave chromaticity demodulating signal which must maintain a fixed and synchronous phase relation to the NTSC burst component of the received color television signal. To this end, it has been the practice in many receivers to provide an oscillator, phase comparator circuit, and reactance tube circuit operatively connected as described above. The burst component of the received color television signal is separated from the signal to become itself a reference signal against which the frequency of the oscillator is compared.

In the interest of economy, it would be desirable if the functions of the three elements described above, constituting what is commonly referred to as an automatic frequency controlled oscillator circuit, could be accomplished by a single amplifier device such as, for example, a semi-conductor amplifier. However, in color television reception any simplification of such a circuit cannot, in the interest of color fidelity and stability in the reproduced picture, result in any instability or failure to maintain with high precision a synchronized relation between the chromaticity demodulating signal and the received burst.

It is, therefore, an object of the present invention to provide a highly simplified automatic frequency controlled oscillator circuit requiring but a single amplifying element yet having good stability.

It is further an object of the present invention to provide an improved automatic frequency controlled oscillator circuit embodying a semi-conductor device as an amplifier unit.

It is further an object of the present invention to provide a simple circuit based upon a single transistor in which an automatic frequency controlled oscillator action may be derived including the functions of, oscillatory generation of a signal wave, a signal responsive frequency control means for the oscillatory action, and means applying to said frequency control means of a signal representing the phase comparison of the generated oscillatory wave with a reference signal.

It is further an object of the present invention to provide a low cost transistor circuit for use in color television receivers in developing a continuous wave color demodulating signal with the functions of phase comparison, signal generation and phase correction being provided in a single transistor stage.

In the realization of the above objects and features of advantage, it is contemplated in the practice of one form of the present invention to utilize the well known characteristic of a junction type transistor which causes its effective output capacitance to change as some function of collector to base voltage. By employing a crystal filter element in a regenerative feedback path between output circuit and input circuit of the transistor, a sustained oscillation may be developed. Reference signal is then injected in series with the base emitter circuit of the transistor. With a suitable time constant in series with the collector current supply to the transistor, variations in phase between the reference signal and oscillator signal will result in significant changes in the collector voltage, whereby, the output capacitance of the transistor is changed in such a direction as to tune the feedback circuit and bring the phase of the developed signal into agreement with the reference signal.

A more complete understanding of the present invention as well as a fuller appreciation of its objects and features of advantage will be derived from a reading of the following specification especially when taken in connection with accompanying drawings in which:

Fig. 1 is a combination block and schematic representation of one form of color television receiving circuit embodying the present invention; and Fig. 2 is a schematic representation of another form which the present invention may take in connection with the receiver system of the general type shown in Fig. 1.

Turning now to the drawing, there appears in block form the well known and conventional elements of a color television receiving system which are depicted only for the purpose of illustrating a particular use of the present invention as shown schematically and operatively connected in the television receiving system. The color television receiving system comprises a radio frequency tuner 10 receiving signals from an antenna 12. The output of the tuner 10 is applied to a conventional intermediate frequency amplifier designated as I. F. amplifier. A video detector 16 is connected with the output of the I. F. amplifier 14 and is adapted to drive the luminance and chrominance amplifiers 18 and 20 in a conventional fashion. Luminance information is conveyed from a luminance amplifier 18 to the color matrix 22 via the delay line 24. Chrominance information is applied from the chrominance amplifier 20 to the I. and Q. demodulators within the block 26. I. and Q. chromaticity information as derived from the demodulators is also applied after possible additional amplification to the color matrix 22. Red, green and blue color signal information as developed by the color matrix 22 is then applied to the tricolor kinescope 28 for reproduction of the color television signal.

In order that the I. and Q. demodulators may properly demodulate I. and Q. information from the chrominance signal, it is known that the demodulators must be supplied with a continuous wave demodulating signal sometimes referred to as the chromaticity demodulating signal. It is general practice to establish the required frequency of this signal at 3.579545 megacycles which in systems of this type corresponds to the frequency of the transmitted burst component of the color television signal. The burst component in a color television signal of the NTSC type is transmitted for the purpose of acting as a reference to the receiver for synchronous color signal demodulation. The burst component is transmitted during the horizontal blanking interval of the television signal and is conventionally separated from the chrominance signal by means of a simple keyed gate circuit. It is convenient to derive the keying signal for burst separation from the deflection circuit of the television receiver since a modified form of a reaction scanning flyback pulse may be used as a keying signal in that it occurs during the horizontal blanking interval.

Accordingly in the drawing, luminance signal from the amplifier 18 is applied to the block 30 which includes a suitable conventional form of sync separator and deflection circuits. It is from the horizontal deflection circuit within the block 30 that the keying signal 32 is derived and applied to the burst separator circuit 34. As stated here and above, the burst separator circuit 34 may be nothing more than a keyed gate circuit which is turned on by the keying signal 32 during the burst component of the received color signal. Video signal containing the burst component is applied to the burst separator from the chrominance amplifier 20. During the reception of color signals a burst signal 36 will, therefore, appear at the output of the burst separator. In general, the burst comprises approximately nine cycles of the signal having the above mentioned frequency of 3.579545 megacycles or approximately 3.6 megacycles.

In accordance with the present invention, the burst 36 is applied to the primary winding 38 of a coupling transformer 40. The low impedance secondary winding 42 of the transformer is connected in the emitter base path of the transistor 44. This constitutes means for applying burst or reference signal to the input circuit of the transistor. As shown in the drawing, the winding 42 is connected between the base 46 and circuit ground. Forward emitter base bias is obtained from a suitable voltage source (not shown) whose terminals are indicated at 48 and 50. Purely by way of example, a useful voltage source has been indicated at 1.5 volts. This forward bias voltage is applied through the isolating resistor 52 to the emitter 54. The collector 56 is connected through the tuned circuit 58 and through the time constant resistor 60 to a source of reverse bias potential having terminals at 62 and 64. A time constant capacitor 66 is connected from the lower extremity of the tuned circuit 58 to circuit ground. A regenerative feedback path is provided by the crystal filter element 68 and series capacitor 70 to the tap 72 in the tune circuit 58. Oscillatory signal developed in the tank circuit is inductively coupled to the I. and Q. demodulators within the block 26 via the winding 74 inductively.

Details of the operation of the elements shown in block form and their construction are shown in a book entitled "Practical Color Television" printed and distributed by the RCA Service Company, Inc., Camden, New Jersey. The requirements for continuous wave signals to the I. and Q. demodulators and the operation thereof, is also exhaustively discussed.

In the operation of the present invention, the impedance of the secondary winding 42 of the transformer 40 is sufficiently low so that the transistor 46 operates as a sine wave oscillator. The crystal element 68 acting as a high Q filter element, and adjustable trimmer capacity 70, form a series tuned regenerative feedback circuit between the output circuit and input circuit of the transformer amplifier. At the operating frequency, the crystal 68 appears highly inductive with the capacitor 70 and the reactance appearing across the tapped section of the tuned circuit 58 being of a value which will cause the oscillator to sustain operation at a frequency close to the desired 3.579545 megacycle value. The value of reactance appearing between the terminal 72 and circuit ground at the operating frequency will, of course, be a function of the output capacitance of the transistor as determined in part by the effective capacitance between the collector 56 and the base 46. The value of this capacitance as hereinabove noted, is a function of the bias potential applied between the collector and base. Thus should the collector-base potential of the transistor be changed, the frequency of oscillation will be changed due to a change in the reactance value appearing at point 72 with respect to circuit ground.

In accordance with the present invention, the value of resistor 60 and the value of capacitor 66 are desirably chosen to form a time constant circuit having a time constant longer than the period of horizontal deflection or recurrence period of the burst 36. By applying the burst 36 in series with the base ground path of the transistor 46 the phase of the burst is effectively compared with the signal developed by the transistor acting as an oscillator. A change in the phase relationship between the burst 36 and the signal produced by the transistor acting as an oscillator will cause a change in the average collector current of the transistor. The collector current will be, therefore, increased or decreased depending upon the direction and magnitude of the phase difference between the burst and oscillator signal. Assume a phase error which increases the collector current during the burst interval. The charge on capacitor 66 will then be decreased and the effective collector-base bias potential decreased. This change in collector-base potential is such to increase the effective collector base capacitance and shift the tuning of the oscillator in a direction to compensate for the phase error. A phase error of the opposite direction will, of course, decrease the collector base potential and provide an opposite tuning effect on the output circuit so as to again correct the phase of the developed oscillator signal. The smaller the value of capacitor 66 and the larger the value of resistor 60 the greater will be the correction effect noted. It is, therefore, seen that the present invention provides in a single amplifier stage, the functions of phase comparison, automatic reactance tuning and oscillatory signal generation.

Although the present invention has been shown in connection with a color television receiving system, it will be readily understood that the nature of the automatic phase correction output provided by the novel of present invention is such to permit successful application of the present invention into the production of a phase controlled signal for purposes other than color television signal demodulation. Also, although the secondary winding 42 of the transformer 40 has been conveniently shown as connected in the base to ground circuit of the transistor, it is obvious that the reference of burst signal 36 can otherwise be applied to the input circuit without departing from the spirit and scope of the present invention. Likewise, and as taught hereinabove, a means other than the phase comparison action shown in the drawing may be used for altering the average potential of the collector with respect to the base 40. Such means may be manually controllable for adjusting the exact frequency of the oscillator.

Thus in Figure 2, the transformer 40 is shown connected between the emitter 54 and the resistor 52. The actual frequency of operation may be manually variable by means of the potentiometer 78 or 80 either of which permits alteration of the average collector base current of the transistor, thereby changing the effective capacitance across the tuned circuit 58.

Although the output capacitance change tuning effect utilized in the present invention may be attributable in part to changes in the effective collector-base capacitance as a function of collector-base potential, it will be understood that other factors enter into producing the total output capacitance change. Biefly, a semi-conductor amplifier has two major variable capacitance parameters. Actual collector-to-base capacitance is known to vary as a function of polarizing voltage and is attributable to changes in the effective width of the barrier zone between collector and base elements. It is further known that the emitter-to-base capacitance of a semi-conductor amplifier changes as a function of emitter-base potential due to changes in what is called diffusion capacitance, or the charge storing effect of the transistor, as a function of polarizing voltage. These two capacitance effects when combined give rise to the observable frequency sensitive nature of the amplifaction factor of a semi-conductor amplifier. In practice, the result of these effects are measurable at any terminal of the transistor device and in the present invention are most efficaciously utlized in the output circuit.

Having thus described my invention, what is claimed is:

1. In an automatic frequency controlled oscillator system, the combination of: a source of frequency reference signal; a semi-conductor amplifier device having electrodes respectively corresponding to a base, emitter and collector; an emitter bias source means having a first and second terminals; a collector bias source means having a first and second terminals; an impedance means connected between said emitter and said first terminal of said emitter bias source means; a connection from said second terminal of said emitter bias source means to said base electrode to define an input circuit between said emitter and base; a first resonant circuit means tuned to resonate at approximately the frequency of said reference signal when operatively connected as hereinafter defined; a connection from a first point in said resonant circuit to said collector electrode; a resistance means connected from said first terminal of said collector bias source to a second point in said resonant circuit; a capacitor connected from the resonant circuit extremity of said resistance means to the second terminal of said collector bias source means; a connection from said collector bias source means second terminal to said emitter bias source second terminal; a second resonant circuit means connected from a point in said first resonant circuit means to said emitter electrode in a manner to cause oscillation by said amplifier device; and means coupled with said source of frequency reference signal and said amplifier device input circuit to impose therein electrical signal variations corresponding to said reference signal.

2. In an automatic frequency controlled oscilator system, the combination of: a source of frequency reference signal; a semi-conductor amplifier device having electrodes respectively corresponding to a base, emitter and collector; an emitter bias source means having a first and second terminals; a collector bias source means having a first and second terminals; an impedance means connected between said emitter and said first terminal of said emitter bias source means; a connection from said second terminal of said emitter bias source means to said base electrode to define an input circuit between said emitter and base; a first resonant circuit means tuned to resonate at approximately the frequency of said reference signal when operatively connected as hereinafter defined; a connection from a first point in said resonant circuit to said collector electrode; a resistance means connected from said first terminal of said collector bias source to a second point in said resonant circuit; a capacitor connected from the resonant circuit extremity of said resistance means to the second terminal of said collector bias source means; a connection from said collector bias source means second terminal to said emitter bias source second terminal; a second resonant tuned circuit including a crystal filter element in series connection with a capacitor to form a combination; means connecting said combination from a point in said first resonant circuit means to said emitter electrode in a manner causing oscillation by said amplifier device; and means coupled with said source of frequency reference signal and said amplifier device input circuit to impose therein electrical signal variaitons corresponding to said reference signal.

3. In an automatic frequency controlled oscillator system, the combination of: a source of frequency reference signal; a semi-conductor amplifier device having electrodes respectively corresponding to a base, emitter and collector; an emitter bias source means having a first and second terminals; a collector bias source means having a first and second terminals; an impedance means connected between said emitter and said first terminal of said emitter bias source means; a connection from said second terminal of said emitter bias source means and said base electrode to define an input circuit between said emitter and base; a first resonant circuit means tuned to resonate at approximately the frequency of said reference signal when operatively connected as hereinafter defined; a connection from a first point in said resonant circuit to said collector electrode; a resistance means connected from a first terminal of said collector bias source to a second point in said resonant circuit; a capacitor connected from the resonant circuit extremity of said resistance means to the second terminal of said collector bias source means; a connection from said collector bias source means second terminal and said emitter bias source terminal; a second resonant circuit means connected from a point in said first resonant circuit means to said emitter electrode in a manner to cause oscillation by said amplifier device; a transformer having a primary winding and a low impedance secondary winding; means connecting said primary winding to said source of frequency reference signal; and means connecting said secondary winding in series with said input circuit, the impedance value of said secondary winding being sufficiently low to permit maintainence of oscillation by said amplifier device.

4. In an automatic frequency controlled oscillator system, the combination of: a source of frequency reference signal; a semi-conductor amplifier device having electrodes respectively corresponding to a base, emitter and collector; an emitter bias source means having a first and second terminals; a collector bias source means having a first and second terminals; an impedance means connected between said emitter and said first terminal of said emitter bias source means; a connection from said second terminal of said emitter bias source means to said base electrode to define an input circuit between said emitter and base; a first resonant circuit means tuned to resonate at approximately the frequency of said reference signal when operatively connected as hereinafter defined; a connection from a first point in said resonant circuit to said collector electrode; a resistance means connected from a first terminal of said collector bias source to a second point in said resonant circuit; a capacitor connected from the resonant circuit extremity of said resistance means to the second terminal of said collector bias source means; a connection from said collector bias source means second terminal and said emitter bias source second terminal; a second resonant circuit means connected from a point in said first resonant circuit means to said emitter electrode in a manner to cause oscillation by said amplifier device; a transformer having a primary winding and a low impedance secondary winding; means connecting said primary winding to said source of frequency reference signal; and means connecting said secondary winding in series with said connection of said base electrode and said emitter bias source.

5. In a frequency controlled oscillator system the combination of: a semi-conductor amplifier device having electrodes corresponding to a base, emitter and collector and characterized by an effective collector-base capacitance which is a function of the potential appearing between said collector and base electrodes; a source of frequency reference signal of predetermined frequency; input circuit defining means including a bias source connected between said emitter and said base; output circuit defining means including a bias source connected between said collector and emitter; resistance means connected in said output circuit of a value sufficient to render the net collector-base voltage and hence the effective collector-base capacitance of said amplifier device a significant function of collector current; impedance means connected in series with said input circuit means; resonant tank circuit means connected in series with said output circuit; a frequency selective feedback filter means connected between said resonant tank circuit and said impedance means to produce oscillation at a frequency determined by the combination of said tank circuit, said filter means and the effective collector-base capacitance of said amplifier device; and means coupled with said reference signal source and said input circuit for superimposing in said input circuit said reference signal upon oscillatory signals developed by said amplifier device such to permit comparison of the frequency difference between said frequency of oscillation and the frequency of said reference signal such that the average collector current flow is rendered a function of this frequency difference and said collector-base capacitance thereby controlled to effectuate a resultant control of said frequency of oscillation.

6. In a frequency controlled oscillator system the combination of: a semi-conductor amplifier device having electrodes corresponding to a base, emitter and collector and characterized by an effective collector-base capacitance which is a function of the potential appearing between said collector and base electrodes; a source of frequency reference signal of predetermined frequency; input circuit defining means including a bias source connected between said emitter and said base; output circuit defining means including a bias source connected between said collector and emitter; resistance means connected in said output circuit of a value sufficient to render the net collector-base voltage and hence the effective collector-base capacitance of said amplifier device a substantial function of collector current; resistance means connected in series with said input circuit means; a parallel inductance-capacitance resonant tank circuit connected in series with said output circuit; a highly selective narrow band pass crystal filter means connected in regenerative relation between said resonant tank circuit and said input circuit resistance means, said filter having a pass characteristic in the pass range of said tank circuit so as to sustain oscillation in said amplifier device, the value of resonance in said tank circuit taken in combination with said crystal filter and the effective collector-base capacitance of said amplifier device being such to establish the frequency of oscillation in the range of said reference signal frequency; and means coupled with said reference signal source and said input circuit for superimposing said reference signal upon oscillatory signals developed by said amplifier device such to permit comparison of the frequency difference between said frequency of oscillation and the frequency of said reference signal such that the average collector current flow is rendered a function of this frequency difference and said collector-base capacitance thereby controlled to effectuate a resultant control of said frequency of oscillation.

7. A frequency controlled oscillator system according to claim 6 wherein said signal superimposing means comprises a transformer whose primary winding is connected with said source of frequency reference signal and whose secondary winding is serially connected with said base electrode and common to said input and output circuits.

8. In a color television receiving system including synchronous detector means for demodulating color information from a received color television signal, said television signal containing a recurrent synchronizing signal burst component definitive of the signal carrier frequency required for synchronous detection in said detector, a frequency controlled oscillator system for providing said required signal carrier, comprising in combination; means coupled with said receiving system separating said burst component from received television signal; a semi-conductor amplifier having operating electrodes corresponding to a base, emitter and collector and characterized by an effective collector-base capacitance which is a function of the potential appearing between said collector and base electrodes; input circuit means including an emitter bias source connected between said base and said emitter to form an input circuit; output circuit means including a collector bias source connected between said base and said collector to form an output circuit; a parallel inductance-capacitance resonant circuit connected in series with said output circuit between said collector and collector bias source, said resonant circuit being tuned to a frequency substantially equal to the frequency defined by said burst; a resistance-capacitance time constant network connected in series with said output circuit between said resonant circuit and said collector bias source said time constant circuit including a resistor connected to conduct collector current flow such that the collector-base potential and hence the effective collector-base capacitance of said amplifier device is rendered a function of the value of collector current while the time constant value of said time constant network is in excess of the recurrence period of said burst component; a series resonant circuit means connected from a point on said parallel resonant circuit to said emitter electrode, said series resonant circuit means being tuned to a frequency substantially equal to the frequency defined by said burst such to establish sustained oscillation in said amplifier device at a frequency which is a function of collector-base capacitance; and transformer coupling means connected with said burst separating means and in series with said base electrode for simultaneously imposing said separated burst in both said input and output circuits for comparing the frequency of said burst component with said frequency of sustained oscillation to alter the collector-base potential and capacitance as a function of said frequency comparison.

References Cited in the file of this patent

UNITED STATES PATENTS

| | | |
|---|---|---|
| 2,227,066 | Cork et al. | Dec. 31, 1940 |
| 2,332,102 | Mason | Oct. 19, 1943 |
| 2,570,939 | Goodrich | Oct. 9, 1951 |
| 2,666,902 | Koros | Jan. 19, 1954 |

OTHER REFERENCES

"Junction Transistor Equivalent Circuits and Vacuum Tube Analogy," by Giacoletto; pages 1490–1493; Proc. IRE, vol. 40, No. 11, for November 1952.

"Principles of Transistor Circuits," R. F. Shea, John Wiley & Sons, Inc., N. Y. copyrighted September 15, 1953, pages 283–4.

RCA Service Data, 1954, No. T3 for RCA Model CT–100, March 31, 1954.